United States Patent [19]

Eilers et al.

[11] 4,435,843

[45] Mar. 6, 1984

[54] FM RECEIVER FOR GENERAL PROGRAMS AND SPECIAL ANNOUNCEMENTS

[75] Inventors: Norbert Eilers, Hildesheim; Peter Brägas, Itzum, both of Fed. Rep. of Germany

[73] Assignee: Blaupunkt-Werke GmbH, Hildesheim, Fed. Rep. of Germany

[21] Appl. No.: 319,654

[22] Filed: Nov. 9, 1981

[30] Foreign Application Priority Data

May 27, 1981 [DE] Fed. Rep. of Germany ....... 3121088

[51] Int. Cl.[3] .............................................. H04B 1/16

[52] U.S. Cl. ..................................... 455/205; 455/45; 455/32; 455/36; 455/228; 340/825.72; 340/825.73

[58] Field of Search ..................... 455/32, 45, 59, 205, 455/212, 227, 228, 35, 36, 67; 179/1 GD, 1 GS; 340/33, 825.44, 825.72, 825.73

[56] References Cited

U.S. PATENT DOCUMENTS 3,922,607 11/1975 Wysong ............................... 455/45
3,949,401 4/1976 Hegeler et al. ..................... 455/227
4,334,320 6/1982 Liman ............................... 455/227

FOREIGN PATENT DOCUMENTS 2460983 7/1976 Fed. Rep. of Germany ...... 455/228

OTHER PUBLICATIONS

"Verkehrsrundfunk" by Von Peter Bragas, Rundfunktechnische Mitteilungen, vol. 18, No. 4, 8/1974.
L'Onde Electrique, Band 60, No. 10, Oct. 1980, Sgiten 33-38, Paris (Fr), by J. Lepaisant et al.

*Primary Examiner*—Jin F. Ng
*Attorney, Agent, or Firm*—Frishauf, Holtz, Goodman & Woodward

[57] ABSTRACT

To improve reliability of recognition of an announcement recognition (AR) signal radiated by a transmitter upon broadcasting an announcement (e.g. traffic information, news, etc.), in the form of AM modulation of a 57 kHz auxiliary subcarrier, in which the subcarrier may also be modulated by other control signals, the subcarrier is filtered in the receiver, demodulated, and the degree of all modulations, regardless of frequency, on the subcarrier is sensed, and if the modulation changes significantly, for example rises from 60% modulation to 90% modulation (50% change), a switch (4) is activated which inhibits transmission of audio programs from an external source, such as a tape recorder (5), tuner tuned to another station, or the like, and reproduces the announcement being broadcast; termination of the AR signal, forming the AR modulation on the subcarrier, causes the switch to revert for reproduction of previously controlled audio information.

31 Claims, 4 Drawing Figures

FM RECEIVER FOR GENERAL PROGRAMS AND SPECIAL ANNOUNCEMENTS

Reference to related patent and applications, assigned to the assignee of this application, and incorporated herein by reference:

U.S. Pat. No. 3,949,401, HEGELER et al, Apr. 6, 1976.

U.S. Ser. No. 319,653, filed Nov. 9, 1981, EILERS AND BRAGAS "COMMUNICATION SYSTEM, AND TRANSMITTER THEREFOR, INCLUDING SPECIAL ANNOUNCEMENT RECOGNITION" (German Priority No. P 31 21 087.2).

U.S. Ser. No. 319,655, filed Nov. 9, 1981, EILERS and BRAGAS "FM RECEIVER FOR RECEPTION OF SPECIAL ANNOUNCEMENTS AND GENERAL PROGRAMS" (German Priority No. P 31 21 034.1).

The present invention relates to a transmission system, and a receiver therefor, for frequency modulated (FM) radio transmission in which general programs are radiated on the normal, assigned transmitter frequency, and in which special subcarriers are provided to characterize announcements, such as, for example, traffic or other announcements, which are to be radiated in addition to the general programs.

BACKGROUND

The referenced U.S. Pat. No. 3,949,401 describes an FM transmission system in which special recognition frequencies are used for special announcements which are not to be missed by the user of radio receivers, for example automobile radio receivers. Such announcements may, for example, be traffic announcements or sports announcements, and the like. Transmitters which radiate such special announcements can be recognized by radio receiver equipment by sensing an auxiliary carrier which is radiated in addition to the program modulation. A suitable frequency for the additional carrier, besides the program modulation, is 57 kHz which, in stereo transmitters, is radiated as the third harmonic of the 19 kHz stereo pilot tone, in synchronism therewith. The 57 kHz auxiliary carrier is phase-locked to the pilot tone of 19 kHz, so that the zero or null crossings are synchronous, and in the same crossing direction. The auxiliary carrier is used additionally for the transmission of auxiliary information, hereinafter referred to as "recognition", which are superimposed in the form of amplitude modulation on the auxiliary carrier. For a detailed discussion, the referenced U.S. Pat. No. 3,949,401, and the literature cited therein, is referred to.

One of the "recognitions" is radiated together with the announcement. The respective recognition indicates that, during radiation over the FM transmitter, an announcement is being broadcast and, therefore, will be termed herein as announcement recognition, AR for short. An announcement recognition signal—AR signal—corresponds to the signals described as the DK signals in the aforementioned U.S. Pat. No. 3,949,401. The AR signal is within a very narrow frequency band at 125 Hz, modulating the auxiliary carrier of 57 kHz with 30% of the amplitude of the auxiliary carrier.

A receiver which is arranged to operate with the system includes a 57 kHz detector and an amplitude demodulator and switching in the audio stage. The 57 kHz detector and the amplitude demodulator control the switching of the audio output. Various switching arrangements are possible: For example, the amplitude of reproduction during the announcement could be raised to call specific attention thereto—for example to a traffic warning announcement; or, if the receiver is muted, a muting circuit is disabled; or, in a combined radio-cassette recorder, the audio section can be switched over from reproduction from the cassette to reproduction of the announcement when the announcement starts, and for switch-back to reproduction from the cassette when the announcement has terminated. Tape transport in the cassette can also be controlled to cause the cassette to stop and start in synchronism with interruption of its audio output.

The auxiliary 57 kHz carrier can provide further recognition signals. One further such recognition signal is used to characterize a specific transmitting radio station, or a geographic region. All transmitters capable of radiating the announcements which are within a specific geographical region, for example, may be assigned the same region recognition, for short RR, and provide RR signals, which correspond to the BK signals of the aforementioned U.S. Pat. No. 3,949,401. The traffic announcements within a region generally relate to the same geographical area. The region recognition signal modulates the amplitude of the auxiliary carrier continuously with 60% of the auxiliary carrier amplitude. The band width of the various region recognition signals, and their position with respect to each other, is so selected that, with a quality of more than 20, adjacent channel separation of more than 15 db is obtained. Within the available frequency band, six RR signal frequencies have been set in one system, and so relatively positioned that the harmonics of any RR signal fall outside of any other RR signal. Suitable frequencies for region identification, that is, RR signals, are, for example 23.75 Hz, 28.27 Hz, 34.93 Hz, 39.58 Hz, 46.67 Hz, 53.98 Hz, 63.61 Hz, 75.80 Hz, 98.96 Hz and 122.85 Hz.

During an announcement, then, the auxiliary 57 kHz subcarrier is modulated by two recognition signals, namely the AR, announcement recognition, signal, and the RR, region recognition, signal. When no announcement is being given, the auxiliary 57 kHz carrier is modulated only with the RR, the region recognition, signal. Basically, any one transmitter may have a signal representative thereof assigned to it, for radiation on the auxiliary carrier, if the frequency availability of region recognition frequency is sufficient. Thus, the region recogniton signal may also be used as a radio station recognition signal, based upon availability of frequencies, so that, within any one geographical area, different transmitters may have different RR frequencies assigned thereto.

The 57 kHz auxiliary or subcarrier can be used in signal-seeking or scanning receivers to cause a scanning tuner to stop and tune in the specific station which radiates the 57 kHz subcarrier, while passing all others. Since the 57 kHz frequency is the third harmonic of the 19 kHz stereo pilot tone, non-linearities in the transmitter, or in the receiver, may cause harmonics of the 19 kHz pilot tone to be erroneously recognized as a 57 kHz subcarrier, by generating a 57 kHz signal upon tuning to a transmitter which does not radiate this subcarrier at all. To prevent such ambiguities, and to avoid response to a spurious third harmonic, the detector for the 57 kHz auxiliary carrier may include an auxiliary recognition branch which enables the output from the detector only if a further detector also recognizes the RR (region recognition) signal. Such a system is described, for example, in German Patent No. 25 33 946.

In one later circuit, the extent or degree of modulation of the auxiliary carrier by the RR signal is determined; if the appropriate degree of modulation of 60% is detected, scanning of the frequency band of a scanning receiver is interrupted and the receiver is locked to that station. This system operates satisfactorily within wide ranges of reception. Under some severe transmission and reception conditions, however, erroneous switching still can occur due to erroneous evaluation of the signal received and erroneous decoding of the signal which may simulate an AR signal. For example, multipath reception may cause modulation of the 57 kHz auxiliary carrier in such a manner that the AR modulation is simulated, thus triggering erroneous switch-over of the audio stage. This situation may occur, for example, if a vehicle is traveling at a given speed along a divider or picket fence which, by the fortuitous coincidence of spacing of pickets or supports, speed of the passing vehicle, and terrain, or other fortuitous conditions, causes modulation of the 57 kHz carrier at a frequency erroneously simulating the AR frequency.

THE INVENTION

It is an object to improve the recognition of radiation of an announcement recognition AR signal in the receiver to insure that all announcements which are radiated are appropriately reproduced.

Briefly, the receiver includes a modulation recognition circuit which senses overall modulation by amplitude modulation of the auxiliary subcarrier and provides a recognition output signal when the overall modulation level or percentage changes significantly, that is, changes by a predetermined value. Upon such recognition, a control signal is generated which controls switch-over of the audio section of the receiver from reproduction of audio signals in accordance with previously connected programming to receive the announcement or special program which is characterized by the AR signal.

DRAWINGS

Figure 1:
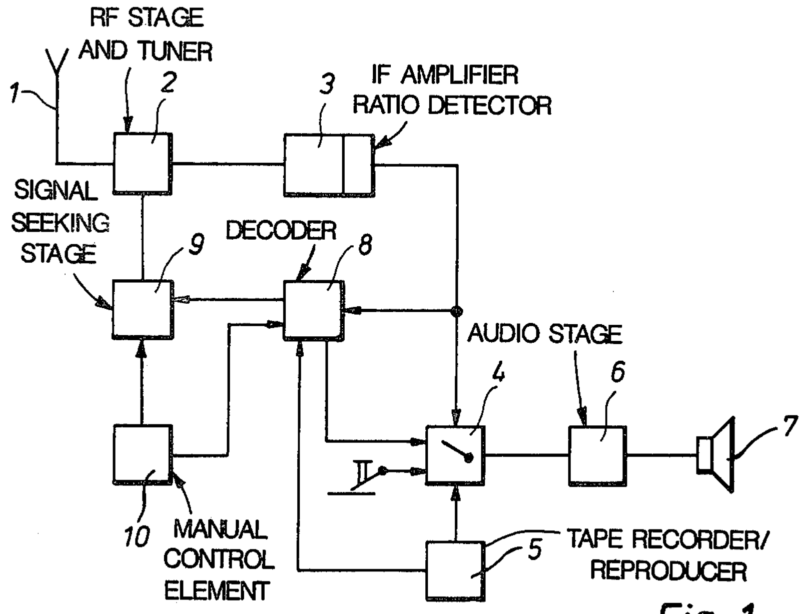
FIG. 1 is a schematic block diagram of an FM receiver, omitting all components not necessary for an understanding of the present invention.

An antenna 1—FIG. 1—applies received input signals to a radio frequency (RF) stage 2, which includes a tuner to tune the receiver to a desired station. An intermediate frequency (IF) stage 3 is connected to a ratio detector from which the program content information which is radiated can be derived. The modulation includes an amplitude-modulated 57 kHz auxiliary carrier. A transfer switch 4 is provided to connect, selectively, signals to an audio amplifier 6 and from then on to a loudspeaker 7, which are derived either from an external audio source, shown as a tape recorder 5, or from the ratio detector 3.

The switch 4 can be operated either manually or automatically. Switch-over can be controlled automatically under command of an announcement decoder 8 which is also connected to receive the output from the IF amplifier and ratio detector 3, forming the FM IF amplification and demodulation stage. The decoder 8 is connected to a signal searching or automatic tuning system, similarly to the tuning system of a panaromic or frequency spectrum receiver, shown as signal seeking stage 9, which controls the tuning adjustment of tuner 2. It is placed in operation by the control element 10. The control element 10 is connected to the decoder 8 to select predetermined signals or transmitters to be sought or tuned under automatic tuning control.

Figure 2:
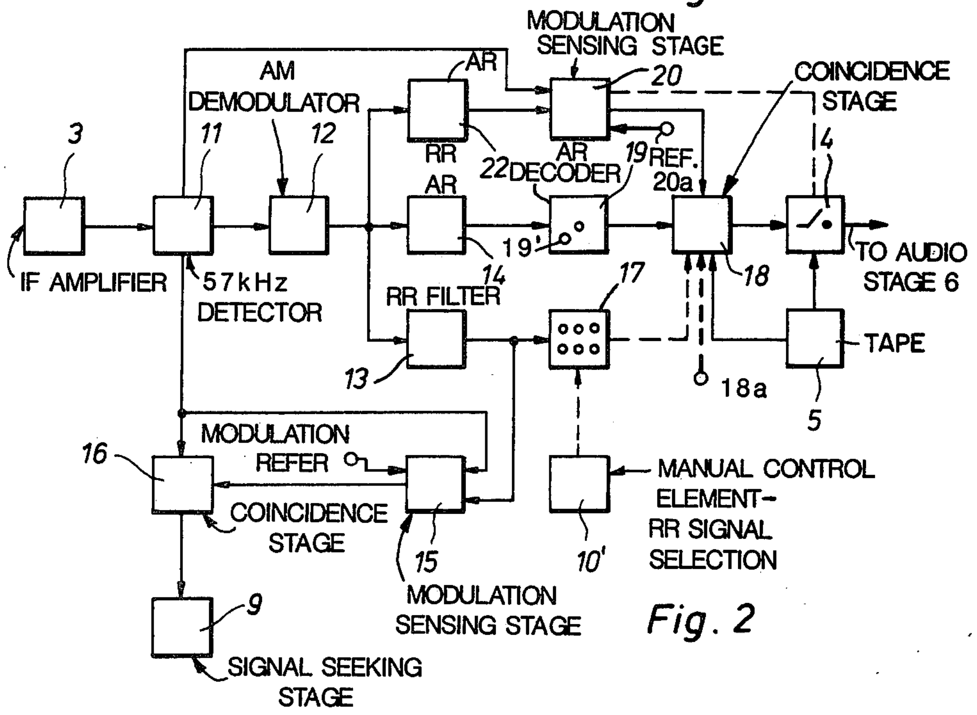
FIG. 2 is a block circuit diagram of an announcement decoder, incorporated in an FM receiver.

The output signal from the IF amplifier stage 3 is applied to the detector 11—see FIG. 2—which analyzes the output signal to detect the presence of an amplitude-modulated 57 kHz auxiliary carrier. Demodulator 12 separates any amplitude modulation on the 57 kHz subcarrier from the carrier. This amplitude modulation may include the RR region and/or radio-station signal as well as the AR signal if it is present, indicating the presence of an announcement or special program content. Two filters 13, 14 are connected to the demodulator 12 to filter out, respectively, the frequencies characteristic of the RR signal—filter 13—and of the AR or announcement recognition signal. The output from filter 14, which passes only the announcement recognition or AR signal, is connected to an AR decoder 19. Ar decoder 19 provides its output signal to a coincidence stage 18.

The output of filter 13 is connected to an RR decoder 17 which indicates the region or radio-station recognition as received from the transmitter. In some units it is possible to select a predetermined region or predetermined radio stations; if the system includes this feature, the manual control element 10′, corresponding to element 10 (FIG. 1) is provided, to select the particular region or radio station desired. Since this is not a necessary feature, the connection between unit 10′ and RR decoder 17 is shown in broken lines. The RR decoder 17 provides a second output signal to the coincidence stage 18 if the predetermined RR signal and the RR signal which is derived from the filter 13 coincides. Since this coincidence may be lacking, the connection between elements 17 and 18 is shown in broken lines.

If the inputs of the coincidence stage 18 simultaneously have a signal applied thereto, then switching stage 4 receives a switching command signal which controls switching of the audio stage 6 of the receiver through the switch 4 to the receiver RF and IF stage, if the receiver was previously in another reproduction mode, for example had been connected to reproduce a program content from the tape recorder/reproducer 5.

The switching arrangement 4 connected to the audio stage of the receiver responds each time when the transmitter provides a signal which includes the characteristic of the AR signal, and if the receiver—tape recorder/reproducer combination has previously been connected to reproduce output from tape, and only if the tuning stage of the receiver also is tuned to a transmitter which radiates the RR signal which has been selected by manual control element 10′, and if this transmitter also provides the special program content, for example an announcement.

An evaluation or sensing element 15 is provided, connected to filter 13 which recognizes the degree of modulation of the auxiliary 57 kHz carrier by the RR signal. As long as the analyzed modulation as sensed by the modulation sensing stage 15 is above a command or reference value, a second coincidence stage 16 receives a control signal which is applied to the signal seeking stage 9 as a basis to test for the presence of the 57 kHz auxiliary carrier, and the degree of modulation thereof, in order to inhibit further tuning of the receiver RF tuner stage, that is, to lock the receiver to the station which radiates the 57 kHz signal, modulated as sensed by modulation sensing stage 15.

The decoder, so far described, is known, and is used in many types of mobile radios, particularly adapted to receive traffic announcements.

Figure 3:
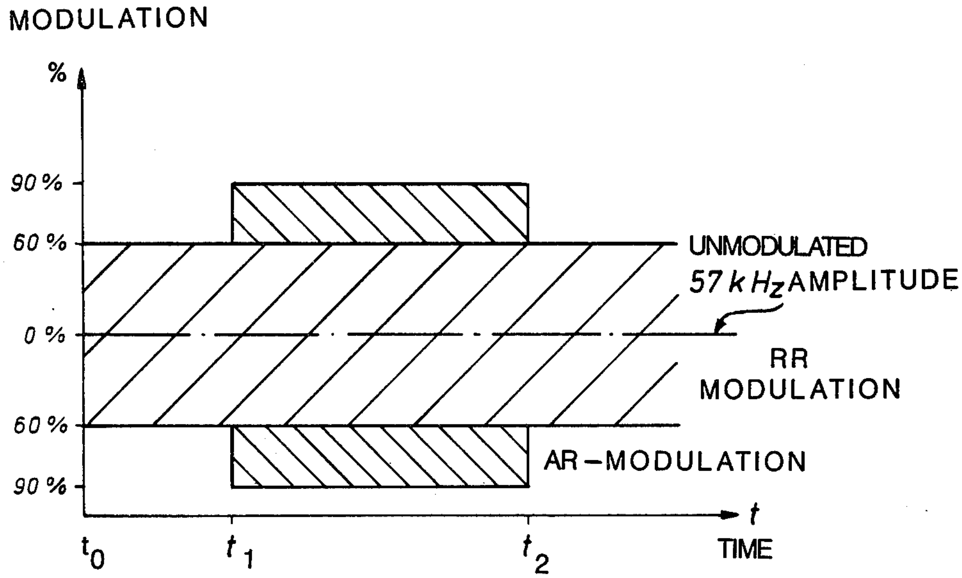
FIG. 3 illustrates percentage modulation, with respect to time, of the auxiliary carrier, in accordance with the prior art.

In accordance with the present invention, the circuit as known includes a further filter 22 which is connected in parallel to the two filters 13, 14, at the output of the demodulator 12. The pass band of filter 22 is so selected that it covers all possible frequencies within the frequency range of the AR signals as well as the RR signals. This filter is connected to a second modulation sensing stage 20 which determines the entire degree of modulation of the amplitude of the auxiliary 57 kHz carrier, that is level of, modulation body by the AR and RR signals. As best seen in FIG. 3, the degree of modulation of the 57 kHz subcarrier changes with presence of both the RR and the AR signals, in contrast to the degree of the modulation when the RR signal only is present. The AR signal is present during the time when the RR signal also is present. The AR signal is present only during the time that a special program, for example an announcement, is being radiated.

The modulation sensing stage 20 receives a reference signal at reference input terminal 20*a*. It can be essentially similar to the modulation sensing stage 15. One output of the modulation sensing stage 20 is connected to the coincidence stage 18. Upon change in the degree of modulation of the 57 kHz auxiliary carrier from, for example, 60% to, for example, approximately 90%, that is, upon a significant change in modulation, the modulation sensing stage 20 provides an output control signal to the coincidence stage 18. Thus, the coincidence stage 18 provides its output signal to the switch only if the overall degree of modulation changes by a significant value, in the present case by introducing a change of 50% of the prior modulation, that is, from, for example, about 60% to about 90%.

The transfer switch 4, thus, will respond only if, besides recognition of the frequency of the AR signal, the degree of modulation of the auxiliary carrier also changes materially, by rising significantly. When the degree of modulation again drops to 60%, the predetermined value as determined, for example, by the reference applied to terminal 20*a*, the transfer switch 4 is reset.

In some sets, it is desirable to control the transfer switch 4 not only from the coincidence gate 18 but also from the modulation stage 20. Since this connection is not necessary, it is shown in broken lines. In some other sets, the connection shown in broken lines, only, will be sufficient.

Operation, with reference to FIG. 3: The temporal course of modulation of the 57 kHz auxiliary carrier is shown in FIG. 3. The temporal course is in accordance with the prior art. In advance of time $t_1$, that is, before an announcement or special program, the amplitude of the auxiliary 57 kHz carrier is modulated only by the RR signal. Modulation extends to about 60%, that is, the amplitude of the auxiliary carrier varies between 40% and 160% of its unmodulated value.

Starting at time instant $t_1$, the AR signal is being radiated by the transmitter. In one system, the degree of modulation of the 57 kHz subcarrier by the AR signal alone is 30%; the overall modulation of the 57 kHz subcarrier thus rises from the prior 60% modulation to 90% modulation, that is, the degree of modulation has changed by 50%, and the amplitude of the subcarrier varies then between 10% and 190% of the unmodulated value. In other systems, the RR modulation is decreased at the same time that the AR modulation level is increased (see copending application Ser. No. 319,653, filed Nov. 9, 1981, by the inventors hereof, "COMMUNICATION SYSTEM, AND TRANSMITTER THEREFOR, INCLUDING SPECIAL ANNOUNCEMENT RECOGNITION"). Regardless of the type of transmission, however, the receiver will sense, and respond to the change in degree of modulation of the 57 kHz subcarrier as an additional criterion besides that mere recognition of the presence of modulation on the subcarrier, so that the presence of the AR signal modulation will be unambiguously detected even in the face of noise or stray signals.

Figure 4:
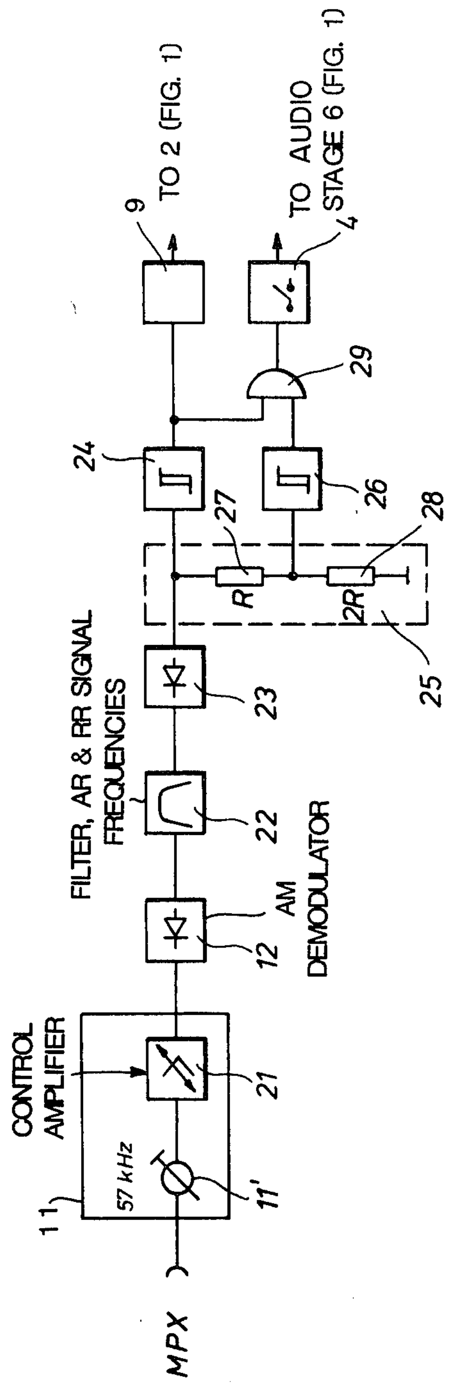
FIG. 4 is a block diagram of a sensing or measuring or evaluation system for a decoder of the receiver of FIG. 2, which provides for evaluation of the overall amplitude modulation level.

The sensing stage 20 is shown in greater detail in FIG. 4: The desired signal modulation MPX received by the receiver from the transmitter, and amplified and detected in IF amplifier and ratio detector 3, is filtered in filter 11' of the 57 kHz detector 11. Filter 11' (FIG. 4) is connected to a control amplifier 21. The control amplifier 21 also causes the amplitude of the auxiliary 57 kHz detector 11 to have constant a value. Such control amplifiers are well known in the art. The time constant of the control amplifier is substantially longer than the time constant of the lowest modulation frequency on the auxiliary 57 kHz carrier; the time constant may be 1 second, or even more. A suitable time is, for example, about 5 times the cycle duration of the lowest frequency of the modulation frequency signals, but may be more. A suitable circuit for amplifier 21 is shown in "Guidebook for Electronic Circuits" by John Markus, McGraw-Hill Book Co., 1974, p. 57, "30 db Dynamic Range" Gain Control Circuit, also published in "Analog Dialogue", Vol. 7, No. 1, page 13.

The output from the control amplifier 21 is applied to the AM demodulator, so that the output of the demodulator provides a signal having the entire amplitude modulation of the auxiliary carrier thereon. The output of the modulator 12 is connected to a low-pass or band-pass filter 22. The upper limiting frequency corresponds to, or is above, the highest modulations frequency of the auxiliary carrier. The output from filter 22 is rectified in the rectifier 23. Since the level of the 57 kHz auxiliary carrier is held constant in the control amplifier 21, it is not necessary to provide a special comparison between the entire modulation amplitude and the amplitude of the unmodulated auxiliary carrier. The output amplitude of rectifier 23, thus, will be unambiguously representative of the degree of modulation of the auxiliary carrier. The output signal from rectifier 23 is connected to a first threshold switch 24, for example a Schmitt trigger. A second Schmitt trigger, also forming a threshold switch, is connected to the output from rectifier 23 over a voltage divider 25. Voltage divider 25 has two resistors 27, 28. The resistor 27, directly connected to the rectifier 23, has half the value as the second resistor 28, the other terminal of which is grounded. Thus, a voltage division 1:2 is obtained.

Schmitt trigger 24 responds as soon as the output voltage of the rectifier 23 reaches a level which corresponds to one modulation level, for example 60%, of the auxiliary 57 kHz carrier. The second Schmitt trigger 26, set for the same threshold level as Schmitt trigger 24, will respond only when the modulation degree rises by 50% over that causing response of the first Schmitt trigger 24; in the example, rises to a modulation degree of 90%. The increase in modulation from 60% to 90% occurs when the AR signal (FIG. 3) is radiated by the transmitter. The further rise in voltage at the output of the rectifier of course does not influence the Schmitt trigger 24 anymore. The output signals of the two Schmitt triggers 24, 26 are logically combined in an AND-gate 29 which provides directly or indirectly (see also FIG. 2) the control signals for switching the switch 4 controlling the source signal for audio stage 6 to reproduce in loudspeaker 7.

The output signal from AND-gate 29 provides a control signal when the degree of modulation of the 57 kHz auxiliary carrier rises significantly over a predetermined level, for example a level of modulation of 60% due to the RR signal (see FIG. 3). Of course, upon termination of the elevated degree of modulation, that is, upon termination of the AR signal at time $t_2$, the switch 4 will revert to its prior position, for example reproduction of audio signal from tape recorder 5.

The output signal from Schmitt trigger 24 can also be used to indicate the presence of the auxiliary carrier, and thus can be used in lieu of the output signal from modulation sensing stage 15 and coincidence stage 16 (FIG. 2).

Control of the switch 4 over the coincidence stage 18—solid line of FIG. 2, alone—is preferred if various AR modulation frequencies are used for different types of programs, and the AR modulation frequencies are all in a frequency range which is adjacent the lower limiting frequencies of the radio transmissions. Different AR signals, that is, AR signals of different frequencies, may be used, for example, to provide announcements in different languages, different program content—for example traffic information, general news, sports, or the like.

If the receiver is to operate with a transmission system in which the region or radio-station recognition (RR) signal is absent, because not needed due to geographical dispersion, or the RR signal drops to a low level when the AR signal is being radiated, then the connection from the RR decoder 17 to the coincidence stage 18 may be omitted; or, alternatively, the connection does not require coincidence with the remaining inputs to the coincidence gate 18, for example merely being connected thereto when present so as to characterize the response of the receiver, but not required for transmission of signals to the audio stage 6. For this reason, the connection from decoder 17 to the coincidence stage 18 is shown in broken lines.

Basically, therefore, the receiver provides for change in the switching state of the switch 4 as a function of a significant change in the modulation of the 57 kHz subcarrier, the modulation of which is sensed by the circuit of FIG. 4. "Significant change" cannot be enumerated in specific percentages or degrees of modulation for all purposes; the accuracy and unambiguity of switch-over will depend, however, on clear distinction between various levels of modulation. In the example shown, a 50% change in modulation of the subcarrier—from 60% modulation to 90% modulation—clearly is a "significant change". A smaller change may, however, be suitable, such as, for example, a 30% change of modulation (60% to 80%, for example), or even less if unambiguous switching can be obtained. The system is particularly applicable for mobile radio use, and especially for car radio apparatus which includes tape recording/reproduction audio systems, or other audio reproduction units, such as, for example, CB (Citizen Band) equipment which is reproduced through at least a portion of the audio stage 6 and reproduced by the loudspeaker 7 of the apparatus, and the reproduction of which should be inhibited when a an AR signal is being sensed. A "significant change" in the modulation level, thus, is a change of such magnitude that the modulation stage 20 will respond, unambiguously, when the modulation has changed indicative of the presence of an AR signal, but will not respond to stray or noise signals, or modulations of the 57 kHz detector which is caused by extraneous variations, for example multi-path reception or the like of a receiver installed in a moving vehicle.

The AR decoder 19 can be set to decode a plurality of different Ar signals, if the receiver operates in a system in which various program contents—for example different languages or different program material—are characterized by different AR frequencies. Thus, the AR decoder can be set to recognize a specific frequency within the AR signal band, and the specific selection is schematically indicated by the additional control element 19' in AR decoder unit 19.

The system can be combined with that described in copending application Ser. No. 319,655, filed Nov. 9, 1981, "FM RECEIVER FOR RECEPTION OF SPECIAL ANNOUNCEMENTS AND GENERAL PROGRAMS", Bragas et al to provide yet an additional criterion for coincidence to the coincidence gate 18. Since is not necessary feature, a broken-line connection has been used between an additional coincidence controlling terminal 18*a* and gate 18. The additional coincidence requirement, in accordance with the aforementioned patent application, would be, for example, recognition of a change in degree of modulation of the RR signal only, by connecting an output from the modulation sensing stage 15 to a modulation level sensing stage, similar to stage 20, and analyzing the degree of modulation of the RR signal on the 57 kHz subcarrier, and providing an additional coincidence input at terminal 18*a* if the RR signal changes. FIG. 3 illustrates a system in which the RR signal continues with its modulation level unchanged during transmission of the AR signal; as explained in the referenced applications by the inventors hereof, during radiation of the 57 kHz auxiliary subcarrier with the AR signal, it is also possible to drop the modulation level of the RR signal, or to discontinue modulation with the RR signal entirely; thus, sensing the level of modulation of the 57 kHz subcarrier by the RR signal, as derived from the modulation sensing stage 15, can provide an additional recognition criterion.

We claim:

1. FM receiver having a radio frequency and tuning stage and a demodulator connected thereto for frequency demodulation of received signals including a carrier signal and an auxiliary carrier signal of a predetermined auxiliary subcarrier frequency, said auxiliary carrier being amplitude modulated by at least one modulation signal and, selectively, by at least one further modulation signal;

a detector means connected to the radio frequency and tuning stage for detecting an auxiliary carrier signal for a predetermined auxiliary carrier frequency;

an amplitude demodulator connected to the detector and detecting amplitude modulation on the auxiliary carrier;

a switchable output stage;

a switch connected to the amplitude demodulator and adapted to be controlled as a function of the amplitude modulation of the auxiliary carrier and connected to the switchable output stage;

comprising, means for detecting amplitude modulation of the auxiliary carrier over the entire frequency range of amplitude modulation of the auxiliary carrier;

and level sensing means responsive to said modulation detecting means for providing a switching control signal to said switch when the level of modulation of all the modulation signals on the auxiliary carrier differs by a significant value from a predetermined and detectable modulation level.

2. Receiver according to claim 1, wherein said level sensing means are means to sense a significant rise of the overall level of modulation from said predetermined value, and for providing said switching control signal for the duration of sensing said increased modulation level.

3. Receiver according to claim 2, wherein the level sensing means provides said switching control signal upon a rise of the degree of modulation of the auxiliary carrier from about 60% to about 90%.

4. Receiver according to claim 1, wherein the level sensing means includes means responsive to a change in the level of modulation by about 50% of a prior modulation level.

5. Receiver according to claim 1 or 3 or 4, wherein said detecting means includes a control amplifier and a filter, said filter having a band or frequency path width covering the entire frequency range of the amplitude modulation of the auxiliary carrier;

and a rectifier rectifying the filtered output and providing a signal representative of the level of modulation of said auxiliary carrier;

and wherein said level sensing means comprise two threshold switches, one threshold switch having a first threshold level representative of a first degree of modulation of said auxiliary carrier, and a second threshold switch having a threshold reference level which is significantly higher than the first threshold level; and an AND-function gate connected to the outputs of said threshold switches, said AND-function gate being connected to and controlling the switching operation of said switch.

6. Receiver according to claim 5, wherein the level sensing means further includes a voltage divider connected between the output of the demodulator and said threshold switches, one of said threshold switches being connected to the output of the demodulator and the other being connected to a tap point of the voltage divider;

and wherein both of said threshold switches have the same response level, the tap point of said voltage divider providing a signal to said second threshold switch at a level which is significantly lower than the voltage being applied to said first threshold switch.

7. Receiver according to claim 6, wherein the voltage divider comprises two resistors having a resistance relationship of about 1:2, and the threshold switches are adjusted for a threshold level corresponding to a signal across the voltage divider representative of about 60% modulation of the auxiliary carrier.

8. Receiver according to claim 1, to receive radio transmissions in which the auxiliary carrier is, selectively, amplitude-modulated with an announcement recognition (AR) signal within a first frequency range;

and wherein an announcement recognition decoder means is connected to receive the amplitude-modulated auxiliary subcarrier and to provide an output signal if the frequency of the announcement recognition signal is detected;

said system further including a coincidence stage having the output from the announcement recognition decoder means and from the level sensing means applied thereto, said coincidence stage being connected in controlling relation to said switch (4).

9. Receiver according to claim 1, in combination with an external source of audio signals, wherein the switchable output stage comprises an audio stage;

said switch being connected to, selectively, connect an audio channel from said external source to the audio stage or audio signals received by the receiver to the audio stage, said switch being connected to interrupt an audio signal path from the external source to the audio stage when said level sensing means senses a significant increase in the amplitude modulation of the auxiliary subcarrier, and to reconnect said audio channel to the external source upon termination of the significant change, and reversion to a prior level of modulation of the auxiliary subcarrier.

10. Receiver according to claim 9, wherein said external source of audio signals comprises at least one of tape reproduction equipment, C.B. receiver, and the like;

and said auxiliary subcarrier has a frequency of about 57 kHz, said significant rise in the level of the subcarrier modulation being a change of about 50% of the modulation level from about 60% to about 90% of modulation of the 57 kHz auxiliary subcarrier.

11. Receiver according to claim 1 wherein the means for detecting amplitude modulation of the auxiliary subcarrier detect aamplitude modulation at the respective frequencies of the at least one modulation signal and the further modulation signal.

12. Receiver according to claim 11 including means for detecting coincident presence of change in level of amplitude modulation and presence of the at least one further modulation signal.

13. In a radio receiving system having an FM radio receiver, an audio output stage including switching means switchable among various audio signal sources in addition to the FM receiver a method of removing ambiguities of recognition of a control signal with respect to a received signal which includes a control signal portion and other signal portions, in which the received signal is a frequency-modulated (FM) signal and includes an auxiliary subcarrier within its frequency band, said subcarrier being amplitude-modulated by at least one recognition frequency signal and, selectively, by a further recognition frequency signal within a recognition frequency band, the signal having said recognition frequencies forming the control signal portion, the improvement comprising the steps of filtering the auxiliary subcarrier from the received signal;

detecting total modulation level of amplitude modulation of the subcarrier by the two recognition signals and providing an output signal representative of the total level of amplitude modulation of the subcarrier for controlling the audio output stage.

14. Method according to claim 13, wherein the step of detecting the total level of amplitude modulation of the subcarrier comprises determining a significant change in the level of modulation with respect to a previously prevailing level of modulation;

and the step of providing the output signal comprises providing said output signal when the change in the level of modulation exceeds a significant level.

15. Method according to claim 14, wherein said step of providing the output signal comprises providing said output signal when the change in amplitude modulation is about 50% of the prior level of modulation.

16. A radio receiver including, means responsive to radio broadcasts of assigned frequency for reproducing regular program content;

means responsive to an auxiliary carrier of predetermined frequency amplitude modulated with first and second recognition signals at first and second recognition signal frequencies for causing said receiver to reproduce an auxiliary special broadcast;

the means responsive to the auxiliary carrier including means for detecting the combined level of modulated amplitude of the auxiliary carrier by the first and second recognition signals modulating the auxiliary carrier; and means connected to the means for detecting for controlling the receiver reproduction to reproduce the special broadcast only when the combined level of modulation amplitude detected by the detecting means exceeds a predetermined percentage level of the auxiliary carrier.

17. The receiver according to claim 16 further comprising, in addition to the means for detecting the combined level, means for responding to the second recognition signal to produce an output, and said means for controlling the receiver reproduction being connected to the combined level detecting means and the means for responding to the second recognition signal to switch an audio output stage into reproducing relation to the special broadcast.

18. The receiver according to claim 17 further comprising, in addition to the means for detecting the combined level, means for responding to the first recognition signal to produce an output, and said means for controlling the receiver reproduction being further connected to the means for responding to the first recognition signal to cause switching of the audio output stage to reproduce the special broadcast when the first and second recognition signals are detected and the combined modulation level above said predetermined percentage occurs.

19. The receiver according to claim 18, wherein the means for responding to the first recognition signal comprises means for selecting one of plural frequencies identifying particular broadcast sources.

20. The receiver according to claim 17, wherein the means for controlling the receiver reproduction includes coincidence circuit means connected with said means for detecting the combined level of modulation by the first and second recognition signals and connected with said means for responding to the second recognition signal, said coincidence circuit means being connected in controlling relation to a switching means for connecting the audio stage to the special broadcast.

21. The receiver according to claim 17, wherein the means for responding to the second recognition signal comprises means for selecting one of plural frequencies identifying one of plural special broadcasts.

22. The receiver according to claim 16 further comprising, a signal seeking circuit means responsive to at least one of the first and second recognition signals to select a received transmission.

23. The receiver according to claim 22 further including, means connecting the signal seeking circuit means to a first combined modulation level detection circuit forming a part of the combined level detection means and having a first threshold level above which an output is applied to the signal seeking circuit means sufficient to cause the signal seeking circuit means to fix on a broadcast signal.

24. The receiver according to claim 23 further including, a second level detection circuit forming a part of the combined level detection means and having a second threshold level representing said predetermined percentage level above which a broadcast is reproduced, and means responsive to outputs of the first and second level detection circuits and connected to the means for controlling the receiver for connecting an audio stage in reproducing relation to a demodulated signal with an auxiliary special broadcast.

25. The receiver according to claim 16, wherein the means for detecting the combined level includes a filter adapted to pass modulations of the auxiliary carrier at both the first and second frequencies of the first and second recognition signals and a modulation sensing stage for determining the level of the combined modulation with respect to the level of the auxiliary carrier.

26. For use in an FM radio receiver having a tuner, an RF stage, an output audio stage including switching means switchable among various audio signal sources in addition to the FM receiver, the improvement comprising means for detecting total amplitude modulation of an auxiliary subcarrier of a preselected frequency value by at least two distinct recognition signals at two distinct frequencies and for producing an output when the modulation by the two recognition signals exceeds a predetermined value, and means responsive to the output from said means for detecting for controlling said switching means to connect the receiver to its audio stage when said modulation above a predetermined value is detected.

27. The improvement according to claim 26 further comprising, means for detecting the amplitude modulation of the auxiliary carrier by one of the two distinct recognition signals simultaneously with detecting amplitude modulation exceeding said level, said means for controlling being connected to said means for detecting modulation by the one signal to effect switching of the receiver to its audio stage when both said one recognition signal and said modulation above a predetermined value are detected.

28. The improvement according to claim 27, wherein the means for controlling includes second means for ascertaining the amplitude modulation of the auxiliary carrier by the other of the two distinct recognition signals simultaneously with detecting the amplitude modulation with the first recognition signal and amplitude modulation exceeding said level, said means for controlling being connected to said second means for ascertaining to effect switching of the receiver to its audio stage when both recognition signals and said modulation above a predetermined value are detected.

29. A method of detecting and reproducing a special broadcast including monitoring radio broadcasts for an auxiliary carrier; determining whether said auxiliary carrier, when presents contains at least one of a first and second recognition signal amplitude modulating the auxiliary carrier at at least one of a first and second frequency, determining whether the total of the amplitude modulation of the auxiliary carrier at the first and second frequencies exceeds a predetermined value, and switching the special broadcast to an audio output stage when the total of the amplitude modulation at the first and second frequencies exceeds the predetermined value.

30. The method according to claim 29, further comprising monitoring received broadcasts for the presence of at least one of the first and second recognition signals, and producing a switching signal when the presence of one of the recognition signals coincides with the level of modulation exceeding the predetermined level.

31. The method according to claim 30, wherein the step of producing the switching signal includes producing that signal only when the presence of both recognition signals coincides with the level of modulation exceeding the predetermined level.

* * * * *